United States Patent [19]  [11]  4,197,229
Blount  [45]  Apr. 8, 1980

[54] PROCESS FOR THE PRODUCTION OF AN AQUEOUS DISPERSION OF POLY(ORGANIC-POLY-SULFIDE-SILICATE) COPOLYMER

[76] Inventor: David H. Blount, 5450 Lea St., San Diego, Calif. 92105

[21] Appl. No.: 19,178

[22] Filed: Mar. 9, 1979

Related U.S. Application Data

[63] Continuation-in-part of Ser. No. 921,728, Jul. 3, 1978, abandoned, which is a continuation of Ser. No. 881,247, Feb. 27, 1978, abandoned.

[51] Int. Cl.$^2$ .............................................. C08J 3/00
[52] U.S. Cl. ...................... 260/29.2 M; 260/29.2 TN; 528/25; 528/31; 528/76; 528/388; 528/389; 528/425

[58] Field of Search .................. 528/25, 31, 388, 389, 528/425, 76; 260/29.2 M, 29.2 TN

[56] References Cited

U.S. PATENT DOCUMENTS

Re. 19207  4/1934  Patrick ................................. 528/388
2,470,115  5/1949  Stewart ................................ 528/388

Primary Examiner—Melvyn I. Marquis

[57] ABSTRACT

An alkali metal hydroxide, sulfur, and an oxidated silicon compound are mixed, then heated to just above the melting point of sulfur while agitating for 10 to 30 minutes, thereby producing an alkali metal polysulfide silicate; then it is added to an aqueous solution containing an emulsifying or dispersing agent and is reacted with a polysubstituted organic compound, thereby producing a poly(organic-polysulfide-silicate) copolymer.

11 Claims, No Drawings

PROCESS FOR THE PRODUCTION OF AN AQUEOUS DISPERSION OF POLY(ORGANIC-POLY-SULFIDE-SILICATE) COPOLYMER

CROSS-REFERENCE TO RELATED APPLICATIONS

This application is a continuation-in-part of my copending U.S. patent application, Ser. No. 921,728, filed July 3, 1978, now abandoned, which is a continuation of my U.S. patent application, Ser. No. 881,247, filed Feb. 27, 1978, now abandoned.

BACKGROUND OF THE INVENTION

This invention relates to a process for the production of poly(organic-polysulfide-silicate) copolymers by reacting alkali metal hydroxide, sulfur and an oxidated silicon compound to produce an alkali metal-polysulfide-silicate condensation product which is then reacted with an organic compound to produce a poly(organic polysulfide silicate) copolymer.

In my U.S. patent application, Ser. No. 921,728, filed by David H. Blount, M.D., on July 3, 1978, alkyl dihalides are used as the organic reactant to produce a polymer, but not an aqueous dispersion of the copolymer.

The poly(organic-polysulfide-silicate) copolymer of this invention is produced in the form of an aqueous dispersion with particle sizes of about a micron to larger-size crumbs or pellets. The size of the particles may be varied by using various emulsifying or dispersing agents and by varying the concentration of the reactants. The aqueous dispersion of the poly(organic-polysulfide-silicate) copolymer is an improvement in the formation of the thioplast silicate elastomer as illustrated in U.S. patent application, Ser. No. 921,728, filed on July 3, 1978, by David H. Blount, M.D.

Furthermore, by operating in accordance with the present invention, I am also able to secure the poly(organic-polysulfide-silicate) copolymers referred to above in the form of an aqueous emulsion or latex, which can be readily purified, and from which poly(organic-polysulfide-silicate) copolymers may be coagulated, either before or after the incorporation into the latex of desired compounding ingredients. In addition, by securing the plastic material in a dispersed state as a latex, it may be used as a coating agent for wood, fabrics, textiles, fibers, paper, leather, metal, concrete and others, and may subsequently cause the plastic material to coagulate in situ.

Aqueous dispersions of poly(polysulfide-silicate) copolymers are obtained from reacting the following components:
  (a) sulfur;
  (b) an alkali metal hydroxide;
  (c) an oxidated silicon compound;
  (d) an organic compound having at least two carbon atoms, each of which is attached to a substituent which will split off during the reaction;
  (e) an emulsifying or dispersion agent;
  (f) water.

Component (a)

Sulfur in any of its commonly known forms may be used in this invention. The sulfur may also be reacted with an alkali metal compound to produce alkali metal sulfides and alkali metal polysulfide, or sulfur may be reacted with alkaline earth metal compounds to produce alkaline earth metal sulfides and alkaline earth metal polysulfides, and mixtures thereof may be used in this process. It is preferred to use sulfur. The alkali metal sulfides and alkaline earth metal sulfides may be used with sulfur. Ammonium polysulfides and polysulfides of ethanolamines may also be used.

Component (b)

Any suitable alkali metal hydroxide may be used in this invention. Alkali metal oxides may also be used in this invention. Suitable alkali metal hydroxides include sodium hydroxide, potassium hydroxide, lithium hydroxide, and mixtures thereof. Sodium hydroxide is the preferred alkali metal hydroxide.

Component (c)

Any suitable oxidated silicon compound may be used in this invention such as silica, e.g., hydrated silica, silicon dioxide, silicoformic acid, polysilicoformic acid, silicic acid gel and silica sol, alkali metal silicates, alkaline earth metal silicates and natural silicates with free silicic acid radicals and mixtures thereof. Silica is the preferred oxidated silicon compound.

Component (d)

Any suitable organic compound that will react with the alkali-polysulfide-silicate may be used. An organic compound is preferable, having at least two carbon atoms, of which one is attached to a substituent, which are split off during the reaction. These organic compounds which are the reactants used in the preparation of poly(organic polysulfide silicate) copolymers have the graphical skeleton carbon structure of

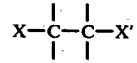

where

represents two adjacent carbon atoms, or

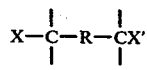

where X and X' represent the substituents which split off during the reaction. The R between the pair of reactive carbon atoms is selected from the following groups: saturated straight chain carbon atoms, unsaturated carbon atoms, ether linkages, aromatic structures, and others, for it is to be understood that other intervening structures may be employed. The X and X' substituents can be halogen, acid sulfate, nitrate, acid phosphate, bicarbonate, formate, acetate, propionate, laurate, oleate, stearate, oxalate, acid malonate, acid tartrate, acid citrate and others. Examples of these organic compounds include, but are not limited to:

| Structure | Name |
|---|---|
| CH$_3$CHXOCHX'CH$_3$ | AA' disubstituted ethyl ether; |
| XC$_2$H$_4$OC$_2$H$_4$X' | BB' disubstituted ethyl ether; |
| XCH$_2$OCH$_2$X' | Disubstituted methyl ether; |
| XC$_2$H$_4$OC$_2$H$_4$OC$_2$H$_4$X' | Disubstituted ethoxy ethyl ether; |
| XCH$_2$CH$_2$SCH$_2$CH$_2$X' | Disubstituted thio ethyl ether; |
| XCH$_2$OCH$_2$C(CH$_3$)(CH$_3$)CH$_2$OCH$_2$X' | Disubstituted 1,3 methoxy 2,2,di-methyl propane; |
| XCH$_2$CH$_2$CH$_2$OCH$_2$OCH$_2$CH$_2$CH$_2$X' | Disubstituted dipropyl formal; |
| 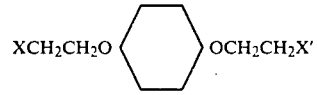 | Disubstituted para-diethoxy benzene; |
| XCH$_2$OCH$_2$CH(X')OCH$_3$ | Disubstituted dimethoxy ethane; |
| XCH$_2$CH$_2$OC(=O)OCH$_2$CH$_2$X' | Disubstituted diethyl carbonate; |
| XCH$_2$C(=O)OCH$_2$CH$_2$OC(=O)CH$_2$X' | Disubstituted glycol diacetate; |
| 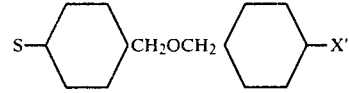 | pp' Disubstituted dibenzyl ether; |
| 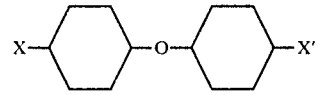 | pp' Disubstituted diphenyl ether; |
| XCH$_2$CH$_2$SO$_2$CH:CH$_2$X' | Disubstituted diethyl sulphone; |
| CH$_3$CH$_2$CHXOCHX'CH$_2$CH$_3$ | AA' Disubstituted propyl ether; |
|  | Para Disubstituted benzene; |
|  | Disubstituted para xylene; |
| 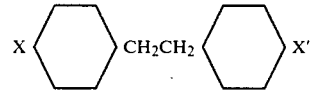 | pp' Diwubtituted dibenzyl; |
| 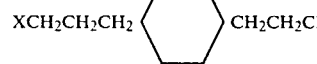 | Disubstituted para hexyl propyl benzene; |
| 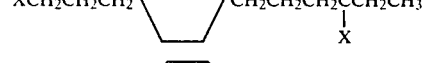 | Disubstituted 3 toyl propene 2; | and others such as methylene chloride or bromide, ethylene dichloride, ethylene dibromide, propylene dichloride or dibromide, halohydrins, epihalohydrins, dihalides of unsaturated hydrocarbon gases derived from pressure-cracking processes, natural gas-cracking processes as well as compounds having more than two substituents such as 1,1,2 trichloroethane; 1,2,4 trichlorobutane; 1,2,3,4 tetrachlorobutane; trichloromesitylene and the like. Mixtures of these compounds may be used in this process.

Component (e)

Emulsifying or dispersing agents may be used in this invention to produce aqueous emulsions of the poly(organic polysulfide silicate) polymer. Any salt-stable compound which is highly hydrophobous in nature and has a hydrophobic group as one component and a hydrophilic group as the other may be used. The emulsifying or dispersing agent which may be used for the formation of lattices of small-particle size are those compounds having such groups as SO$_3$, SO$_4$, NH$_2$, etc., as the hydrophilic component and a higher molecular weight alkyl, aralkyl, aryl or alkyl group as the hydrophobic component. The more hydrophobic the entire compound becomes, the smaller the polymer particle size becomes in the latex.

Compounds which are most suitable as emulsifying or dispersing agents for latex formation are the lignin sulfonates such as calcium and sodium lignin sulfonates, alkyl benzene sulfonates having more than 20 carbon atoms in the alkyl group, aryl alkyl sulfonates, sorbitan monolaurates, especially those which are oil soluble and slightly water soluble, and others. The dominance of the hydrophobic group over the hydrophilic groups is one of the important factors in producing a latex of small-particle size. The molecular weight of the hydrophobic group alone is not the deciding factor, for aryl groups, for example, may be more hydrophobic than an alkyl group of like molecular weight. Aryl alkyl groups are more hydrophobic than alkyl aryl groups of the same molecular weight. Thus by selection of emulsifying or dispersing agents, the particle size of the latex can be varied to suit any particular needs. Emulsifiers which can be used are sorbitan monolaurates, alkyl aryl sulfonates, alkyl aryl sulfates, aryl alkyl sulfonates, aryl alkyl sulfates, lignin sulfonates, methyl cellulose, sulfonated petroleum fractions, polymerized alkyl aryl sulfonates, polymerized aryl alkyl sulfonates, soybean lecithin, and the like. The particle size can be controlled by selecting emulsifying or dispersing agents having different molecular-weight hydrophobic groups as well as different hydrophobic groups. The particle size will also vary with the concentration of the emulsifying or dispersing agents.

In certain cases, other dispersing agents such as magnesium hydroxide or aqueous dispersions of peptized starch, gelatin, glue, blood-albumen, egg albumen, or the like, may be used.

The preferred process to produce poly(organic-polysulfide-silicate) copolymers in the form of an aqueous dispersion is to mix 1 to 4 parts by weight of Component (a) (sulfur), about 2 parts by weight of Component (b) (alkali metal hydroxide) and 1 to 2 parts by weight of Component (c) (oxidated silicon compound), then to heat the mixture to just above the melting temperature of sulfur while agitating at ambient pressure for 10 to 30 minutes, thereby producing an alkali metal-sulfur-silicate condensation product which is then added to water to produce an aqueous solution containing 10% to 70% alkali metal-sulfur-silicate condensation product. The solution is then filtered to remove any reactants that are not water soluble. A disubstituted and/or polysubstituted organic compound, capable of splitting off the substituted radical to react with the alkali metal radical, and of reacting the organic radical with the sulfur-silicate radical, in the amount wherein the mols of the substituted radicals are about equivalent to the mols of the alkali metal radicals, and 1% to 5% by weight, based on weight of the water, of an emylsifying or dispersing agent are added to the aqueous solution of the alkali metal-sulfur-silicate condensation product, then vigorously agitated or passed through a homogenizer. The mixture is agitated at ambient temperature at a temperature just below the boiling temperature of the reactants for 30 minutes to 8 hours, thereby producing an aqueous dispersion of poly(organic-polysulfide-silicate) copolymer.

The proportion of the disubstituted organic compound to alkali metal-sulfur-silicate condensation product is not critical; either may be in excess, but since the alkali metal-sulfur-silicate condensation product is the least expensive, it is preferred that an excess of it be used. The chemical reaction between the disubstituted organic compound and the metal-sulfur-silicate condensation product is usually not exothermic and usually there is very little change in the temperature of the solution. The chemical reaction will take place at any suitable temperature and pressure, but the chemical reaction is speeded up when the solution is heated to just below the boiling temperature of the reactants.

The components may be mixed in any satisfactory manner, or various components may be reacted first, then reacted with the rest of the components. Components (a) and (b) may be pre-reacted to produce alkali metal polysulfides, then be reacted with Component (c) to produce the alkali metal-sulfur-silicate condensation product. Components (a) and (c) may be pre-reacted, then reacted with Component (b) to produce alkali metal-sulfur-silicate condensation products. Components (b) and (c) may be pre-reacted to produce an alkali metal silicate, then reacted with sulfur to produce alkali metal-sulfur-silicate condensation products.

Various water-soluble sulfides and polysulfides may be added with the alkali metal-sulfur-silicate condensation product, such as alkali metal sulfides, alkaline earth metal sulfides, ammonium sulfides, alkali metal polysulfides, alkaline earth metal polysulfides, polysulfides of ethanolamines and mixtures thereof in the amount of up to 2 parts by weight to 4 to 8 parts by weight of the alkali metal-sulfur-silicate condensation product.

Alkali metal silicate produced by any of the methods known in the arts may be used in place of the alkali metal hydroxide and oxidated silicon compound. It is used in the amount of 1 to 2 parts by weight with 1 to 4 parts by weight of sulfur. The alkali metal silicate may also be used as the oxidated silicon compound and reacted with the sulfur and alkali metal hydroxide to produce alkali metal-sulfur condensation products. About 1 to 2 parts by weight of granular alkali metal silicate are mixed with 1 to 4 parts by weight of sulfur, then heated to above the melting point of the sulfur while agitating at ambient pressure for 10 to 30 minutes, thereby producing a yellow, granular alkali metal silicate-sulfur condensation product. Then about 2 parts by weight of the alkali metal hydroxide are added to the alkali metal silicate-sulfur condensation product while heating to just above the melting point of sulfur while agitating for 10 to 30 minutes, thereby producing alkali metal-sulfur-silicate condensation products.

The fine granular oxidated silicon compound may be first reacted with sulfur by mixing 1 to 4 parts by weight of the sulfur with 1 to 2 parts by weight of the oxidated silicon compound. Then the mixture is heated to just above the melting temperature of sulfur while agitating for 10 to 30 minutes, thereby producing a sulfur-silicate condensation product. Then about 2 parts by weight of an alkali metal hydroxide, preferably sodium hydroxide, are added, and the mixture is heated to just above the melting temperature of sulfur while agitating for 10 to 30 minutes, thereby producing an alkali metal-sulfur-silicate condensation product. It may be necessary to add 1 to 2 parts by weight of the alkali metal hydroxide if all the alkali metal hydroxide-sulfur-silicate condensation product does not go into solution, then to reheat the solution at 80° C. to 100° C. for 10 to 30 minutes.

The particles in the aqueous dispersion of the poly(organic-polysulfide-silicate) copolymer may vary in size from about a micron in diameter to pellet size. The dispersions are heavy particles and settle. The particles may be washed with water to remove the salt and the unreacted components by filtering or by decantation. The aqueous dispersion may be coagulated on flocculation with aluminum sulfate, calcium nitrate, mineral acid, organic acids, inorganic hydrogen containing salts and the like. The washed particles may be dried, then fused into sheets by raising the temperature to the softening temperature of the polymer. This washed and dried polymer may be cured with zinc oxide to produce an elastomer when heated to 70° C. to 90° C. To vulcanize the elastomer, the washed and dried polymer (100 parts by weight), 30 to 60 parts by weight of carbon black, 0.5 part by weight of stearic acid, 10 parts by weight of zinc oxide, 0.3 part by weight of benzothiozyl disulfide and diphenyl guanidine are thoroughly mixed, then heated in a mold until the mixture softens (70° C. to 90° C.); then pressure is applied to the elastomer until it cools.

The coagulated poly(organic-polysulfide-silicate) copolymer forms a gray-to-white-colored elastic, spongy mass. It has the characteristics of a soft plastic and is pliable. Its characteristics may be improved by incorporating into it metallic oxides such as litharge, zinc oxide, magnesium oxide or other compounds of the class of sulphur carriers well known in the rubber industry.

Various inert materials such as those of the type used in compounding rubber, for example, fibers, wood flour, carbon black, glue, asbestos and the like, may be compounded with the latex, either with or without the sulphur carrier. These various materials may be incorporated in the coagulated latex also. About 1 to 10% by weight of the metallic oxide is used.

The coagulated latex and the vulcanized poly(organic-polysulfide-silicate) polymers are stable in organic solvents, resist the action of oils, salt water and the like, and do not flow under pressure. The aqueous dispersion of poly(organic-polysulfide-silicate) copolymer is stable and may be preserved and stored as such.

The aqueous dispersion of poly(organic-sulfur-silicate) polymer may be used to coat or impregnate absorbent materials such as fabrics, textiles, fibers, paper, leather and the like, as well as non-absorbent materials such as synthetic filaments and fibers, wood, metal, concrete, and others and subsequently cause the coagulation in situ of the desired poly(organic-polysulifide-silicate) copolymer.

The coagulated poly(organic-polysulfide-silicate) copolymers formed may be vulcanized and used to produce rubber hoses, sheets, rubber rollers, tanks, diaphragms, gaskets and wire covering. The aqueous dispersion and coagulated polymer may be used for caulking, putties, adhesives, binders, coatings for wood and metal, in epoxy resins, as molding material, in urethane resins and foams, and may be reacted with acid compounds to produce thiol groups in the polymer. The thiol groups will react chemically with polyisocyanates to produce useful foams and elastomers.

The coagulated poly(organic-polysulfide-silicate) copolymer which has been washed and dried may be mixed with 1% to 10% by weight of a metal oxide such as zinc oxide powder. Optionally, fillers may be added and thoroughly mixed. The mixture may be placed in a mold of a useful object such as a gasket, then heated to 70° C. to 90° C. wherein the mixture becomes soft; then pressure is applied. The mold is then cooled, thereby producing a useful, tough, strong gasket.

The primary object of the present invention is to produce an aqueous dispersion of poly(organic-polysulfide-silicate) copolymers. Another object is to produce an aqueous dispersion of poly(organic-polysulfide-silicate) copolymers that can be used as coating agents and be coagulated in situ. Still another object is to produce an aqueous dispersion of poly(organic-polysulfide-silicate) copolymers that may be coagulated and used as caulking compounds, as molding powder, and may be vulcanized to produce useful products such as hoses, tubes, sheets, etc.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of aqueous dispersions of poly(organic-polysulfide-silicate) polymers. Parts and percentages are by weight unless otherwise indicated.

EXAMPLE 1

About 5 parts by weight of sulfur, 2 parts by weight of fine granular hydrated silica and 5 parts by weight of sodium hydroxide flakes are mixed, then heated to above the boiling temperature of sulfur for 10 to 30 minutes, thereby producing a sodium hydroxide-sulfur-silicate condensation product.

EXAMPLE 2

About 2 parts by weight of fine granular hydrated silica and 3 parts by weight of sulfur are mixed, then heated to just above the melting temperature of sulfur while agitating for 10 to 30 minutes, thereby producing sulfur-silicate condensation product; then 3 parts by weight of sodium hydroxide flakes are added while agitating and heating the mixture to just above the melting temperature of sulfur for 10 to 30 minutes, thereby producing an alkali metal-sulfur-silicate condensation product.

EXAMPLE 3

About 2 parts by weight of sulfur, 1 part by weight of fine granular hydrated silica and 2 parts by weight of potassium hydroxide pellets are mixed, then heated to above the boiling temperature of sulfur while agitating for 10 to 30 minutes, thereby producing a potassium-sulfur-silicate condensation product.

EXAMPLE 4

About 2 parts by weight of sulfur, 1 part by weight of fine granular silica and 2 parts by weight of sodium hydroxide flakes are mixed, then heated to just above the melting point of the sulfur, while agitating for about 30 minutes, thereby producing a sodium-sulfur-silicate condensation product.

EXAMPLE 5

About 1 part by weight of fine granular hydrated silica, and 2 parts by weight of sulfur are mixed, then heated to just above the melting temperature of sulfur while agitating for 10 to 30 minutes, thereby producing a sulfur-silicate condensation product; the product is then added to 15 parts by weight of water containing 2 parts by weight of sodium hydroxide and 0.5 part by weight of sodium sulfide. The mixture is heated to just below the boiling temperature of the mixture while agitating at ambient pressure for 1 to 4 hours, thereby producing an aqueous solution of sodium hydroxide-sulfur-silicate condensation product.

EXAMPLE 6

About 3 parts by weight of sulfur and 2 parts by weight of granular sodium silicate are mixed, then heated to just above the melting temperature of sulfur while agitating at ambient pressure for 10 to 30 minutes, thereby producing an alkali metal-sulfur-silicate condensation product.

EXAMPLE 7

Example 6 is modified wherein 2 parts by weight of sulfur are used.

EXAMPLE 8

About 4 parts by weight of sulfur, 1 part by weight of sodium sulfide and 3 parts by weight of granular potassium silicate are mixed, then heated to just above the melting temperature of sulfur while agitating for 10 to 30 minutes, thereby producing an alkali metal-sulfur-silicate condensation product.

EXAMPLE 9

About 3 parts by weight of sulfur, 2 parts by weight of potassium sulfide and 2 parts by weight of fine granular calcium silicate are mixed, then heated to just above the melting temperature of sulfur while agitating at ambient pressure for 10 to 30 minutes, thereby producing an alkali-sulfur-silicate condensation product.

EXAMPLE 10

About 3 parts by weight of sulfur, 1 part by weight of silica, 1 part by weight of calcium silicate and 2 parts by weight of sodium hydroxide are mixed, then heated to just above the boiling temperature of the sulfur while agitating for 10 to 30 minutes, thereby producing an alkali-sulfur condensation product.

EXAMPLE 11

About 2 parts by weight of sodium hydroxide, 1 part by weight of hydrated silica containing Si-H groups (silicoformic acid) and 2 parts by weight of sulfur are mixed, then heated to just above the melting temperature of sulfur while agitating for 10 to 30 minutes, thereby producing alkali metal-sulfur-silicate condensation product.

EXAMPLE 12

About 4 parts by weight of sulfur and 3 parts by weight of sodium hydroxide flakes are mixed, then heated to just above the melting point of sulfur while agitating for 10 to 30 minutes, thereby producing a sodium polysulfide. It is then mixed with 1 part by weight of fine granular silica, then heated to just above the melting point of the sodium polysulfide while agitating for 10 to 30 minutes, thereby producing a sodium hydroxide-sulfur-silicate condensation product.

EXAMPLE 13

About 6 parts by weight of the alkali metal-sulfur-silicate condensation products, as produced in Example 1, are added to 20 parts by weight of water containing 2% sodium lignin sulfonate to form an aqueous solution. The solution is then filtered to remove any unreacted sulfur or silica. Very little is not water-soluble. To the solution is slowly added methylene chloride, in the amount containing mols of chloride nearly equivalent to the mols of sodium atoms present in the solution, while agitating vigorously at a temperature between ambient and a temperature just below the boiling temperature of the methylene chloride for 30 minutes to 8 hours, thereby producing an aqueous dispersion of poly(methylene-polysulfide-silicate) elastomer.

The finely divided particles are dense and slowly settle when the agitation is discontinued. The latex-like dispersion is washed with water to remove the salt and any unreacted reactants, then the water is filtered off. Optionally, fillers, vulcanizing agents, coloring agents, etc., are added. The dispersion is then coagulated by adding a dilute aqueous solution of aluminum sulfate until coagulation takes place, then is washed with water and filtered to remove the salt and unreacted components.

EXAMPLE 14

About 5 parts by weight of the alkali metal-sulfur-silicate condensation product, as produced in Example 2, are added to 20 parts by weight of water containing 4% by weight of calcium lignin sulfonate to form an aqueous solution; then ethylene dichloride is slowly added to the solution, while vigorously agitating the mixture, in the amount containing mols of chloride nearly equivalent to the mols of sodium atoms present in the solution. The solution is then heated to just below the boiling temperature of ethylene dichloride while vigorously agitating for about 30 minutes. The reaction is complete in 30 minutes to 8 hours, thereby producing an aqueous dispersion of poly(ethylene-polysulfide-silicate) elastomer.

The aqueous dispersion of the copolymer slowly settles and the water, salt and unreacted components are removed; then the aqueous dispersion is washed several times and decanted to remove any remaining salt. The copolymer is then dried, mixed with 1% to 10% of zinc oxide, and fillers may be optionally added, then heated to 70° C. to 90° C. under pressure and fused into a cured sheet. The washed aqueous dispersion may be coagulated with acid compounds, then washed to remove the salt. The washed and dried coagulated copolymer may be mixed with curing agents such as metal oxide, vulcanizing catalyst, and optionally with fillers, reinforcing agents, etc., then heated in a mold to 70° C. to 90° C. When the copolymer softens, pressure is applied to the copolymer to fill in the mold, and it is cooled in the mold, thereby producing a useful product.

EXAMPLE 15

About 1 part by weight of the alkali metal-sulfur-silicate condensation product, as produced in Example 3, is added to 3 parts by weight of water containing 3% sodium dodecylbenzene sulphonate to form an aqueous solution; then propylene dichloride is added to the solution until the mols of the chloride and potassium atoms are about equal. The mixture is vigorously agitated, then heated to a temperature just below the boiling temperature of propylene dichloride. The mixture is agitated for about 30 to 60 minutes, thereby producing an aqueous dispersion of poly(propylene-polysulfide-silicate) copolymer.

EXAMPLE 16

About 4 parts by weight of the alkali metal-sulfur-silicate condensation product, as produced in Example 4, are added to 12 parts by weight of water containing 5% sodium dinaphthyl methane disulphonate; then ethylene dichloride containing 5% 1,2,3-trichloropropane is added in the amount wherein the chlorine atoms are about equal to the sodium atoms. The mixture is vigorously agitated until it is thoroughly mixed. The mixture is then heated to a temperature just below the boiling temperature of ethylene dihalide while agitating at ambient pressure for about 30 minutes to 1 hour, and the reaction is complete in 30 minutes to 8 hours, thereby producing an aqueous dispersion of poly(organic-polysulfide-silicate) copolymer.

EXAMPLE 17

About 3 parts by weight of the alkali metal-sulfur-silicate condensation product, as produced in Example 6, and 1 part by weight of $Na_2S_x$ ($x=4$ to 5) are added to water containing 2% sodium salts of ricinoleic sulphonates, thereby producing an aqueous solution. About equal parts by weight of ethylene dichloride and bis(2-chloroethyl) ether, in the amount wherein the chlorine atoms are about equal to the sodium atoms in the mixture, are slowly added to the aqueous solution while vigorously agitating and keeping the temperature just below the boiling temperature of the reactants for 30 minutes to 8 hours, thereby producing an aqueous dispersion of poly(organic-polysulfide-silicate) copolymer.

EXAMPLE 18

To an aqueous solution containing 25% alkali metal-sulfur-silicate condensation product, as produced in Example 7 and containing 2% sodium lignin sulfonate, is slowly added propane, 1,3-dihydrogen phosphate in the amount to give about equivalent mols of the alkali metal and the dihydrogen phosphate radical while vigorously agitating. The mixture is then heated to just below the boiling temperature of the reactants while agitating for about 30 to 60 minutes. The reaction is complete in 30 minutes to 8 hours, thereby producing an aqueous dispersion of poly(organic-polysulfide-silicate) copolymer.

EXAMPLE 19

1,2-nitropropane, in the amount to obtain about equivalent mols of the nitro and alkali metal radicals, is slowly added to an aqueous solution containing 30% alkali metal-sulfur-silicate condensation product, as produced in Example 8, and 3% sodium lignin sulphonate while agitating vigorously. The mixture is then heated to just below the boiling temperature of the reactants while agitating for 30 to 60 minutes. The reaction is complete in 30 minutes to 8 hours, thereby producing an aqueous dispersion of poly(organic-polysulfide-silicate) copolymer.

EXAMPLE 20

An amount of para-Dinitrobenzene, wherein the nitro and alkali metal radicals are about equal, is slowly added to an aqueous solution containing 25% alkali-sulfur-silicate condensation product, as produced in Example 8, and 2% sodium lignin sulphonate while vigorously agitating. The mixture is then heated to just below the boiling temperature of the reactants for 30 to 60 minutes while agitating. The reaction is complete in 30 minutes to 8 hours, thereby producing an aqueous dispersion of poly(organic-polysulfide-silicate) copolymer.

Other disubstituted organic compounds may be used in place of para-Dinitrobenzene such as para dichlorobenzene; 2,4-dinitrotoluene; tolylene diisocyanate; chloroform; 1,3-dichloro-2-propanol; bis(2 chloroethyl) formal; 1,3-dibromopropane; butane-1,4-di(hydrogen sulfate); dichloroethyl ether; methylene chloride; 1,4-dibromo-2-butene; 1,3-chloromethoxy 2,2,di-methyl propane; dichloroethyl carbonate; 2,4 dinitrobenzene sulfonic acid and pp'-dichlorobenzyl.

EXAMPLE 21

An aqueous solution containing 25% sodium hydroxide-sulfur-silicate condensation product, as produced in Example 6, 3% sodium lignin sulphonate, and ethylene dichloride, in an amount which contains equivalent mols of the chlorine atoms to the mols of sodium atoms in the aqueous solution, are mixed, then run through an homogenizer, then heated to just below the boiling temperature of the reactants while agitating for 30 to 60 minutes at ambient pressure. The chemical reaction is complete in 30 minutes to 8 hours, thereby producing an aqueous dispersion of poly(organic-polysulfide-silicate) copolymer. The dispersed particles settle and the copolymer is washed several times with water by decantation to remove the salt and unreacted reactants.

Any of the previously listed emulsifiers and types of emulsifiers can be substituted in the above Example.

Any of the other previously described disubstituted organic compounds may be used in place of the ethylene dichloride in this Example, such as ethylene dibromide, propylene dichloride or dibromide, dihalides of unsaturated hydrocarbon gases derived from pressure-cracking processes, natural gas-cracking processes, polyhalide alkanes such as 1,1,2-trichloroethane; 1,2,4-trichlorobutane; trichloromesitylene; compounds containing disubstituted halogens; acid sulfates, nitrates, acid phosphates, bicarbonates, formates, acetates, propionates, laurate, oleate, stearate, oxalate, acid malonate, acid tartrate, acid citrate and mixtures thereof such as: AA' disubstituted ethyl ether, BB' disubstituted ethyl ether, disubstituted methyl ether, disubstituted ethoxy ethyl ether, disubstituted thio ethyl ether, disubstituted 1,3-methoxy 2,2-dimethyl propane, disubstituted dipropyl formal, disubstituted para-diethoxy benzene, disubstituted dimethoxy ethane, disubstituted diethyl carbonate, disubstituted glycol diacetate, pp' disubstituted dibenzyl ether, pp' disubstituted diphenyl ether, disubstituted diethyl sulphone, AA' disubstituted propyl ether, para-disubstituted benzene, disubstituted paraxylene, p,p'-disubstituted dibenzyl, disubstituted para hexyl propyl benzene, disubstituted 3-toyl propene-2, and mixtures thereof.

Although specific materials and conditions were set forth in the above Examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included as defined in the appended claims.

I claim:

1. The process for the production of an aqueous dispersion of poly(organic-polysulfide-silicate) copolymer by the following steps:
    (a) mixing 2 parts by weight of an alkali metal hydroxide, 1 to 4 parts by weight of sulfur and 1 to 2 parts by weight of an oxidated silicon compound;
    (b) heating the mixture to just above the melting temperature of sulfur while agitating for 10 to 30 minutes, thereby (c) producing an alkali metal-sulfur-silicate condensation product;

(d) adding the alkali metal-sulfur-silicate condensation product to water containing 1% to 5% of an emulsifying or dispersing agent to produce a 10% to 70%, by weight, aqueous solution;

(e) adding a substituted organic compound having at least two carbon atoms, each of which is attached to a substituent selected from group consisting of acid sulfate, nitrate, acid phosphate, bicarbonate, formate, acetate, propionate, laurate, oleate, stearate, oxalate, acid malonate, acid tartrate, acid citrate, halogens, and mixtures thereof, which will split off during the reaction, to said aqueous solution of the alkali metal-sulfur-silicate condensation product in the amount wherein the mols of the substituted radicals are about equal to the mols of the alkali radicals in the mixture;

(f) agitating the mixture at a temperature between ambient temperature and just below the boiling temperature of the reactants for 30 minutes to 8 hours, thereby (g) producing an aqueous dispersion of poly(organic-polysulfide-silicate) copolymer.

2. The process according to claim 1 wherein the alkali metal hydroxide is selected from sodium hydroxide and potassium hydroxide.

3. The process according to claim 1 wherein the oxidated silicon compound is selected from the group consisting of silica, alkali metal silicates, alkaline earth metal silicates, natural oxidated silicon compounds containing free silicic acid and/or oxide groups and mixtures thereof.

4. The process according to claim 1 wherein an alkali metal sulfide, selected from the group consisting of sodium sulfide, potassium sulfide and mixtures thereof, is added in the amount up to 4 parts by weight is added in step (d) of claim 1.

5. The process according to claim 1 wherein up to 2 parts by weight of a water-soluble polysulfide, selected from the group consisting of alkali metal polysulfide, alkaline earth metal polysulfide, ammonium polysulfide, polysulfides of ethanolamine, and mixtures thereof, is added in step (a) of claim 1.

6. The process of claim 1 wherein the substituted organic compound is selected from the group consisting of AA' disubstituted ethyl ether; BB' disubstituted ethyl ether; disubstituted methyl ether; disubstituted ethoxy ethyl ether; disubstituted thio ethyl ether; disubstituted 1,3 methoxy 2,2,dimethyl propane; disubstituted dipropyl formal; disubstituted diethyl formal; disubstituted para diethoxy benzene; disubstituted dimethoxy ethane; disubstituted diethyl carbonate; disubstituted glycol diacetate; pp' disubstituted diphenyl ether; disubstituted dibenzyl ether; disubstituted diethyl sulphone; AA' disubstituted propyl ether; para disubstituted benzene; disubstituted para xylene; pp' disubstituted dibenzyl; disubstituted para hexyl propyl benzene; disubstituted 3-tolyl propene-2; ethylene dichloride; ethylene dibromide; propylene dichloride; propylene dibromide; dihalides of unsaturated hydrocarbon gases derived from pressure-cracking processes and material gas-cracking processes; 1,1,2-trichloroethane; 1,2,4-trichlorobutane; trichloromesitylene, and mixtures thereof.

7. The process of claim 6 wherein the substituted organic compound contains at least two substituents, selected from the group consisting of acid sulfate, nitrate, acid phosphate, bicarbonate, formate, acetate, propionate, laurate, oleate, stearate, oxalate, acid malonate, acid tartrate, acid citrate, halogens, and mixtures thereof.

8. The process of claim 1 wherein the emulsifying or dispersing agent is selected from the group consisting of lignin sulfonates, alkyl aryl sulfonates, aryl alkyl sulfonates, sorbitan monolaurates, alkyl aryl sulfates, aryl alkyl sulfates, methyl cellulose, sulfonated petroleum fractions, polymerized alkyl aryl sulfonates, polymerized aryl alkyl sulfonates, soybean lecithin and mixtures thereof.

9. The process of claim 8 wherein the emulsifying or dispersing agent is lignin sulfonate.

10. The process of claim 1 wherein the substituted organic compound is ethylene dichloride.

11. The product, aqueous dispersion of poly(organic-polysulfide-silicate) copolymer, as produced by the process of claim 1.

* * * * *